(12) United States Patent
Panigrahi et al.

(10) Patent No.: US 10,916,074 B2
(45) Date of Patent: Feb. 9, 2021

(54) VEHICLE WHEEL IMPACT DETECTION

(71) Applicant: Ford Global Technologies, LLC, Dearborn, MI (US)

(72) Inventors: Smruti Ranjan Panigrahi, Farmington Hills, MI (US); Dawei Luo, Garden City, MI (US); Jianbo Lu, Northville, MI (US); Dexin Wang, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 16/036,328

(22) Filed: Jul. 16, 2018

(65) Prior Publication Data

US 2020/0020181 A1 Jan. 16, 2020

(51) Int. Cl.
*G07C 5/08* (2006.01)
*G06N 3/04* (2006.01)
*G01L 5/00* (2006.01)
*G01M 17/013* (2006.01)
*G06N 3/08* (2006.01)

(52) U.S. Cl.
CPC .......... *G07C 5/0808* (2013.01); *G01L 5/0052* (2013.01); *G01M 17/013* (2013.01); *G06N 3/04* (2013.01); *G06N 3/084* (2013.01)

(58) Field of Classification Search
CPC .................................................. G07C 5/0808
See application file for complete search history.

(56) References Cited

U.S. PATENT DOCUMENTS

| 6,609,051 | B2 | 6/2003 | Fiechter et al. |
| 10,395,444 | B1* | 8/2019 | Edren ................... G07C 5/0816 |
| 10,643,285 | B1* | 5/2020 | Tofte .................... G06Q 30/0265 |
| 2016/0280130 | A1 | 9/2016 | Kia et al. |
| 2018/0011953 | A1* | 1/2018 | Micks ..................... G06N 20/00 |
| 2018/0315260 | A1* | 11/2018 | Anthony ................. G06N 20/00 |
| 2019/0354772 | A1* | 11/2019 | Tasli ..................... G06K 9/6215 |

FOREIGN PATENT DOCUMENTS

| CN | 201659856 U | 12/2010 |
| CN | 106198058 A | 12/2016 |
| CN | 107203197 A | 9/2017 |
| WO | 2012020166 A1 | 2/2012 |

* cited by examiner

*Primary Examiner* — Alex C Dunn
(74) *Attorney, Agent, or Firm* — Frank A. MacKenzie; Bejin Bieneman PLC

(57) ABSTRACT

Data describing operation of a vehicle is provided to a deep neural network. A vehicle wheel impact event is determined based on output of the deep neural network. Alternatively or additionally, it is possible to determine the wheel impact event based on output of a threshold based algorithm that compares vehicle acceleration and the velocity to one or more thresholds.

13 Claims, 6 Drawing Sheets

US 10,916,074 B2

VEHICLE WHEEL IMPACT DETECTION

BACKGROUND

Vehicle wheel impacts, e.g., caused by a vehicle traveling along a roadway and a vehicle wheel being impacted by a pothole, bump, etc., can impair vehicle operation and/or give rise to repair and/or maintenance needs. A vehicle occupant may not be aware of risks posed by vehicle wheel impacts, especially if a vehicle is operated autonomously or semi-autonomously.

DETAILED DESCRIPTION

Figure 1:
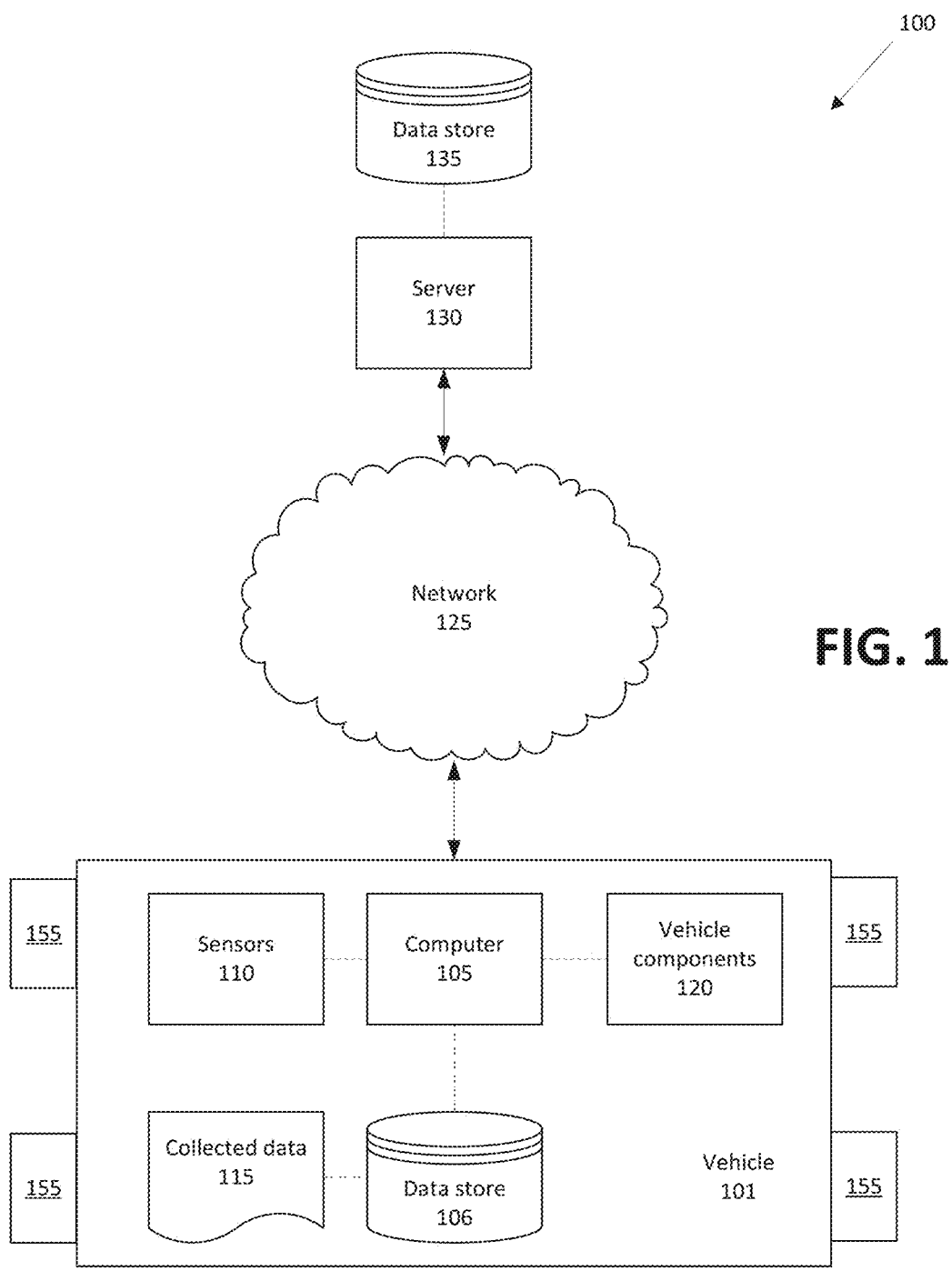
FIG. 1 illustrates an example system for detecting, and making adjustments to vehicle operation based on vehicle impact events.

A computer comprises a processor and a memory, wherein the memory stores instructions executable by the processor to provide data describing operation of a vehicle to a deep neural network; and determine a vehicle wheel impact event based on output of the deep neural network. The computer can further include instructions to determine the wheel impact event based on output of a threshold based algorithm that compares vehicle acceleration and velocity to one or more thresholds. The computer can further include instructions to compare a first impact severity level output from the deep neural network to a second impact severity level output by the threshold based algorithm. The data describing operation of the vehicle can include at least one of velocity, yaw rate, roll rate, total acceleration, vertical acceleration, lateral acceleration, longitudinal acceleration, a wheel speed, a brake torque, an accelerator pedal position, a steering angle, and an ignition status. The computer can further include instructions to actuate a vehicle component based on the wheel impact event. The wheel impact event can include one or more of an impact severity, a predicted impact cause, and an identification of an impacted wheel. The impact severity can be selected from a plurality of impact severity levels.

Further, a computer comprises a processor and a memory, wherein the memory stores instructions executable by the processor to provide a first set of vehicle data to a deep neural network; provide a second set of vehicle data to a threshold based algorithm that compares vehicle acceleration and velocity to one or more thresholds; and determine a vehicle wheel impact event based on output of the deep neural network and the threshold based algorithm. The computer can further include instructions to compare a first impact severity level output from the deep neural network to a second impact severity level output by the threshold based algorithm. The computer can further include instructions to determine that the first impact severity level and the second impact severity level differ, and to then determine the vehicle wheel impact event based on the second impact severity level. Each of the first set of data and the second set of data can include at least one of velocity, yaw rate, roll rate, total acceleration, vertical acceleration, lateral acceleration, longitudinal acceleration, a wheel speed, a brake torque, an accelerator pedal position, a steering angle, and an ignition status. The computer can further include instructions to actuate a vehicle component based on the wheel impact event. The wheel impact event can include one or more of an impact severity, a predicted impact cause, and an identification of an impacted wheel. The impact severity can be selected from a plurality of impact severity levels.

A method comprises providing data describing operation of a vehicle to a deep neural network; and determining a vehicle wheel impact event based on output of the deep neural network. The method can further comprise determining the wheel impact event based on output of a threshold based algorithm that compares vehicle acceleration and the velocity to one or more thresholds. The method can further comprise comparing a first impact severity level output from the deep neural network to a second impact severity level output by the threshold based algorithm. The data describing operation of the vehicle can include at least one of velocity, yaw rate, roll rate, total acceleration, vertical acceleration, lateral acceleration, longitudinal acceleration, a wheel speed, a brake torque, an accelerator pedal position, a steering angle, and an ignition status. The method can further comprise actuating a vehicle component based on the wheel impact event. The wheel impact event can include one or more of an impact severity, a predicted impact cause, and an identification of an impacted wheel.

FIG. 1 illustrates an example system 100 for detecting, and making adjustments to vehicle 101 operation based on, impacts to wheels 155 (see FIG. 2) of a vehicle 101 i.e., detected impact events. A computer 105 in the vehicle 101 is programmed to receive collected data 115 from one or more sensors 110 for determining an impact event. For purposes of the present disclosure, an "impact event" is defined as a determination by a vehicle 101 computer 105, based on collected sensor 110 data 115, that one or more vehicle 101 wheels 155 have been impacted by an external object (e.g., a rock, a speed bump, a pothole, a crack in a road, etc.) with a severity that could affect performance and/or a state of repair of the vehicle 101.

In general, vehicle 101 data 115 may include data about operation of the vehicle 101, e.g., data about one or more components 120, including wheels 155, as well as data about a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data. Collected data 115, such as illustrated in Table 1 below, typically describes operation of the vehicle 101. That is, collected data 115 typically describes a characteristic or attribute of the vehicle 101 and/or a component 120 thereof while the vehicle 101 is moving on a roadway, has an ignition status of ON, etc. Table 1 below lists examples of collected data 115, e.g., typically available from a vehicle controller area network (CAN) bus or the like, along with notation used herein for the data 115:

TABLE 1

| Data | Definition | Notation |
| --- | --- | --- |
| Acceleration | Acceleration, i.e., first derivative of a velocity vector of the vehicle. | $a_{total}$ |
| Longitudinal acceleration | Acceleration along, i.e., in a direction defined by, a longitudinal axis (i.e., running from front to rear) of a vehicle | $a_x$ |
| Lateral acceleration | Acceleration along a lateral axis of a vehicle (i.e., an axis perpendicular to the longitudinal axis) | $a_y$ |
| Vertical acceleration | Acceleration along a vertical axis of a vehicle (i.e., an axis perpendicular to a plane defined by the longitudinal and lateral axes) | $a_z$ |
| Vehicle speed (or velocity) | Speed of the vehicle, at any given instant measured as if the vehicle is proceeding in a direction of the longitudinal axis; a velocity vector includes speed and a directional component. | V |
| Yaw rate | Angular velocity of the vehicle about the vertical axis | $\varphi$ |
| Roll rate | Angular velocity of the vehicle about the longitudinal axis | $\Phi$ |
| Pitch rate | Angular velocity of the vehicle about the lateral axis | |
| Brake torque | Force applied at a brake wheel to slow or stop the wheel | $brk_{trq}$ |
| Accelerator pedal position | Position (typically an angular position, i.e., an angle of rotation) of an accelerator or throttle control typically expressed with reference to a zero or undepressed position, i.e., zero is undepressed and 100% is fully depressed. | AP |
| Steering angle | Angle between a longitudinal axis of a vehicle a longitudinal axes of steered wheels (can be expressed as a negative angle when to left, and positive when to the right, or vice versa). | SA |
| Ignition status | Specifies whether the vehicle ignition is ON or OFF, i.e., typically a binary variable. | IS |
| RCM signals | Signals or data from an RCM (restraint control module), e.g., indicating deployment of a passive restraint device such as an airbag. | RCM |
| Wheel speed front left | Wheel speed of the vehicle's front left wheel, measured in linear speed units, e.g., kilometers per second, obtained by multiplying wheel diameter, $\pi$, and revolutions per unit of time, e.g., second, e.g., $W_{FL} = \pi * d * rps$. | $W_{FL}$ |
| Wheel speed front right | Wheel speed of the vehicle's front right wheel. | $W_{FR}$ |
| Wheel speed rear left | Wheel speed of the vehicle's front right wheel. | $W_{RL}$ |
| Wheel speed rear right | Wheel speed of the vehicle's front right wheel. | $W_{RR}$ |

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, and the like. It will be noted that under this definition, wheels 155 are a component 120; the wheels 155 are assigned a separate reference number to better support the description that follows.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 101 includes a plurality of wheels 155, e.g., four wheels 155. The wheels 155 support a vehicle 101 body and allow the vehicle 101 to move along a roadway or the like. Each wheel 155 has a respective wheel speed sensor 110. The wheel speed sensor 110 detects rotation of the wheel 155 and outputs a rotational speed thereof. Wheel speed can then be determined as defined above.

Data Threshold Based Determination

Figure 2:
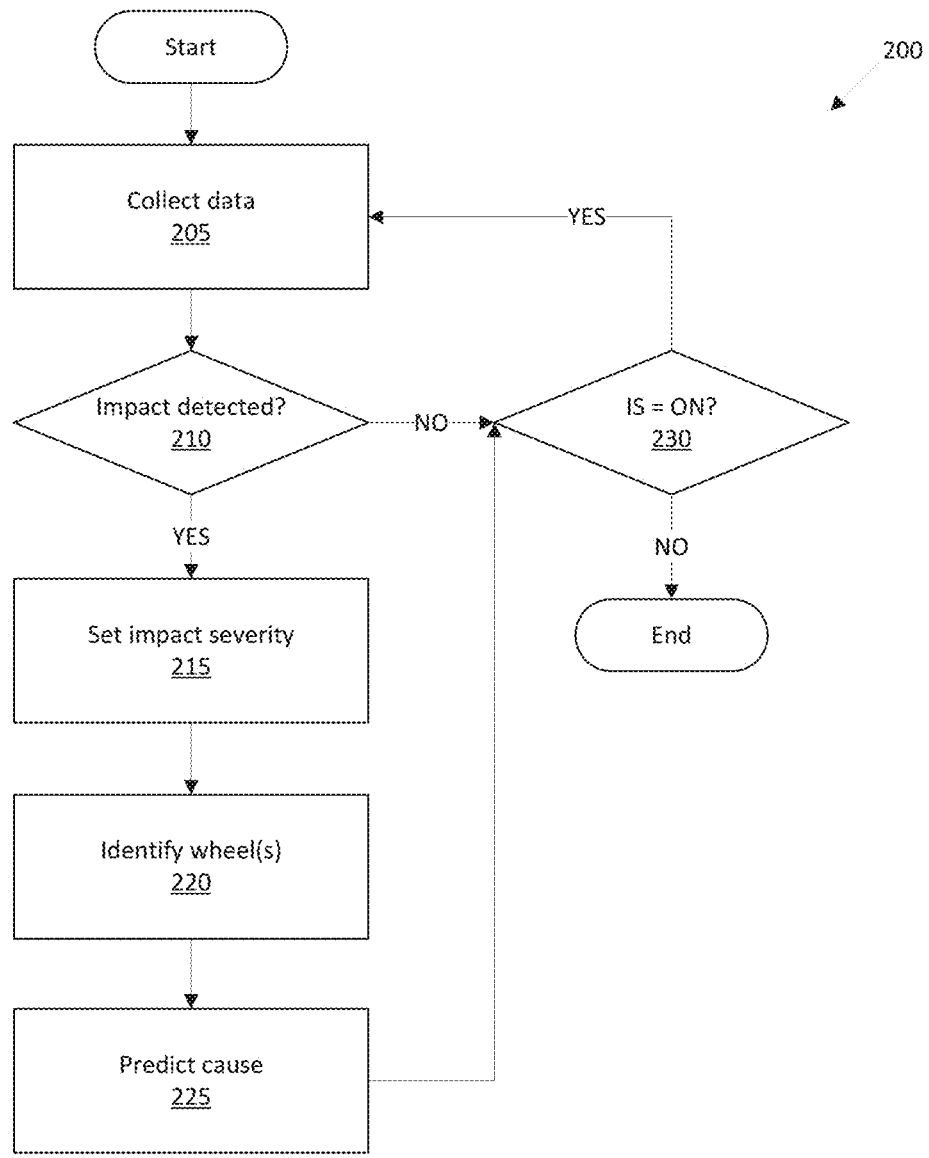
FIG. 2 illustrates an exemplary process for identifying an impact event and determining a severity of the impact by determining whether values in collected data meet various thresholds.

FIG. 2 illustrates an exemplary process 200 for identifying a wheel impact event and determining a severity of the impact by determining whether values in collected data 115 meets various thresholds. The process 200 can be referred to as a threshold based algorithm, meaning that the process 200 compares various data 115 to respective thresholds to determine a wheel impact event. The process 200 can be carried out according to instructions in a computer 105. The process 200 can be practiced on its own. Moreover, as discussed further below concerning FIG. 8, threshold-based impact determination can be practiced in combination with DNN-based determination (discussed further below with respect to FIGS. 3-7).

The process 200 begins in a block 205, in which data 115 is obtained, e.g., data such as shown in Table 1, is received, e.g., via a vehicle network such as a CAN bus. The data 115 is stored according to a timestamp indicating a time step at which the data was received; typically data for four or more time steps is accumulated before the process 200 proceeds to the block 210. Further, for a timestep k, the notation $W^-$ refers to an immediately prior, i.e., k−1, timestep, $W^{--}$ refers to a k−2 timestep, etc. In one example implementation, each time step is 10 milliseconds (ms).

Next, in a decision block 210, the computer 105 determines whether various data 115 meets one or more respective thresholds indicating a wheel impact event, i.e., an application of force to a wheel 155 severe enough to potentially damage the wheel 155, has occurred. For example, the computer 105 could evaluate the following expression (1):

$$V_x > V_{min}$$

AND $$((|V_x - W_{FL}| \text{ OR } |V_x - W^-_{FL}| \text{ OR } |V_x - W^{--}_{FL}| \text{ OR } |V_x - W^{---}_{FL}|) \geq \beta * V_x)$$

AND $$((\Delta W_{FL} \text{ OR } \Delta W^-_{FL} \text{ OR } \Delta W^{--}_{FL}) \geq \delta_W \text{ OR } (\varphi \geq \varphi_{min} \text{ AND } \Delta \varphi \geq \delta_\varphi)).$$

Notations in the above expression have the meanings set forth in Table 1. Other notations have meanings as set forth in Table 2:

TABLE 2

| Notation | Meaning |
| --- | --- |
| $V_{min}$ | A minimum velocity threshold for making wheel impact determinations, e.g., empirically determined as a minimum velocity at which meaningful wheel impact determinations can be made. |
| β | An empirically determined constant, e.g., vehicle wheels can be subjected to impact and a vehicle speed $V_x$ adjusted by the constant β to satisfy the above relation. |
| ΔW | Change in wheel speed from an immediately preceding timestep. |
| $\delta_W$ | A minimum threshold change in wheel speed from an immediately prior timestep, e.g., empirically determined by subjecting wheels to specified impacts and noting wheel speed changes. |
| $\varphi_{min}$ | A minimum yaw rate threshold for making wheel impact determinations, e.g., empirically determined as a minimum yaw rate at which a wheel impact could be indicated. |
| $\delta_\varphi$ | A minimum threshold change in yaw rate from an immediately prior time step, e.g., empirically determined by subjecting wheels to specified impacts and noting wheel speed changes. |

Expression (1) above evaluates to TRUE or FALSE (or "1" or "0"), the above example providing an evaluation for a wheel speed $W_{FL}$ of a front left wheel 155. Typically, the computer 105 in the block 210 evaluates conditions, e.g., according to the expression (1), for other wheels 155, e.g., wheel speeds $W_{FR}$, $W_{RL}$, $W_{RR}$. Thus, if the expression (1) evaluates to "true" for one or more of the wheels 155, then a determination is made in the block 210 that a wheel impact is detected. Further, the computer 105 can store data specifying which of the one or more wheels 155 for which an impact is detected. Yet further, if a wheel impact is detected for two or more wheels 155, then the blocks 215, 220, 225 described below could then be executed, e.g., in parallel or sequence or substantially at the same, for each of the wheels 155 for which an impact is detected. With understanding, for convenience, the blocks 215, 220, 225 will be described with respect to a single wheel 155. In any event, upon a determination that a wheel impact is detected, the process 200 proceeds to the block 215. Otherwise, the process 200 proceeds to a block 230.

In the block 215, the computer 105 determines an impact severity for the wheel 155 determined in the block 210 to have experienced an impact. An impact severity describes a degree of significance or severity of a wheel impact. The impact severity can be quantified, e.g., expressed according to a numeric scale. In Table 3 below, which provides an example of conditions that can be applied by the computer 105 to determine impact severity, the impact severity is ranked on a scale of zero to five. Units of acceleration in the below table are standard gravities, sometimes notated "G" or "g." The expression $b_{lim}$ refers to an empirically established brake torque limit, e.g., by subjecting wheels to specified impacts and noting brake torques.

TABLE 3

| Condition | Impact Severity |
|---|---|
| $a_{total} \geq 4$ OR (($a_x \geq 3.5$ OR $a_y \geq 3.5$ OR $a_z \geq 3.5$) | 5 |
| $a_{total} \geq 3$ OR (($a_x \geq 2.5$ OR $a_y \geq 2.5$ OR $a_z \geq 2.5$) | 4 |
| $a_{total} \geq 2$ OR (($a_x \geq 1.5$ OR $a_y \geq 1.5$ OR $a_z \geq 1.5$) | 3 |
| $a_{total} \geq 1$ OR (($a_x \geq .75$ OR $a_y \geq .75$ OR $a_z \geq .75$) | 2 |
| $a_{total} \geq 0.5$ AND ($brk_{trq} \leq b_{lim}$) | 1 |
| Above conditions all fail | 0 (no impact) |

Next, in a block 220, the computer 105 identify specific wheels 155 for which respective impact severities have been determined. The block 220 may be omitted where an impact has been determined for only one wheel 155, i.e., in that case, the wheel for which the impact severity was determined in the block 215 is already known. However, where there are two or more wheels 155 for which an impact was detected in the block 210, the computer 105 can store and impact severity is determined in the block 215 for each of the wheels 155.

Next, in a block 225, the computer 155 evaluates conditions to predict a cause of a detected impact. Note that $a_{zmin}$ is an empirically determined minimum acceleration threshold, e.g., determined based on empirical testing as a vertical acceleration likely to be associated with a wheel impact. Further, it will be noted distinguishing positive and negative roll rates and accelerations (the negative sign typically indicating a left angle of rotation or an upward direction of acceleration can help distinguish a type of cause, and location of the cause, of an impact.

| Condition | Predicted Impact Cause |
|---|---|
| $\Phi \geq \Phi_{min}$ AND $a_z \geq a_{zmin}$ | Bump on left side of vehicle |
| $\Phi \geq \Phi_{min}$ AND $a_z \leq -a_{zmin}$ | Pothole on right side of vehicle |
| $\Phi \leq -\Phi_{min}$ AND $a_z \geq a_{zmin}$ | Bump on right side of vehicle |
| $\Phi \leq -\Phi_{min}$ AND $a_z \leq -a_{zmin}$ | Pothole on left side of vehicle |

The block 230 can be executed following either the blocks 205 or 225. In the block 230, the computer 105 determines whether to continue the process 200. For example, as illustrated in the representation of the block 230 in FIG. 2, the computer 101 could determine whether the vehicle 101 ignition is ON (or OFF). Alternatively or additionally, the computer 105 could be powered off, user input disabling impact detection could be received, etc. If the ignition is powered off, or the process 200 is otherwise not to continue, then the process 200 ends following the block 230; otherwise, the process 200 returns to the block 205.

Deep Learning Determination

Figure 3:
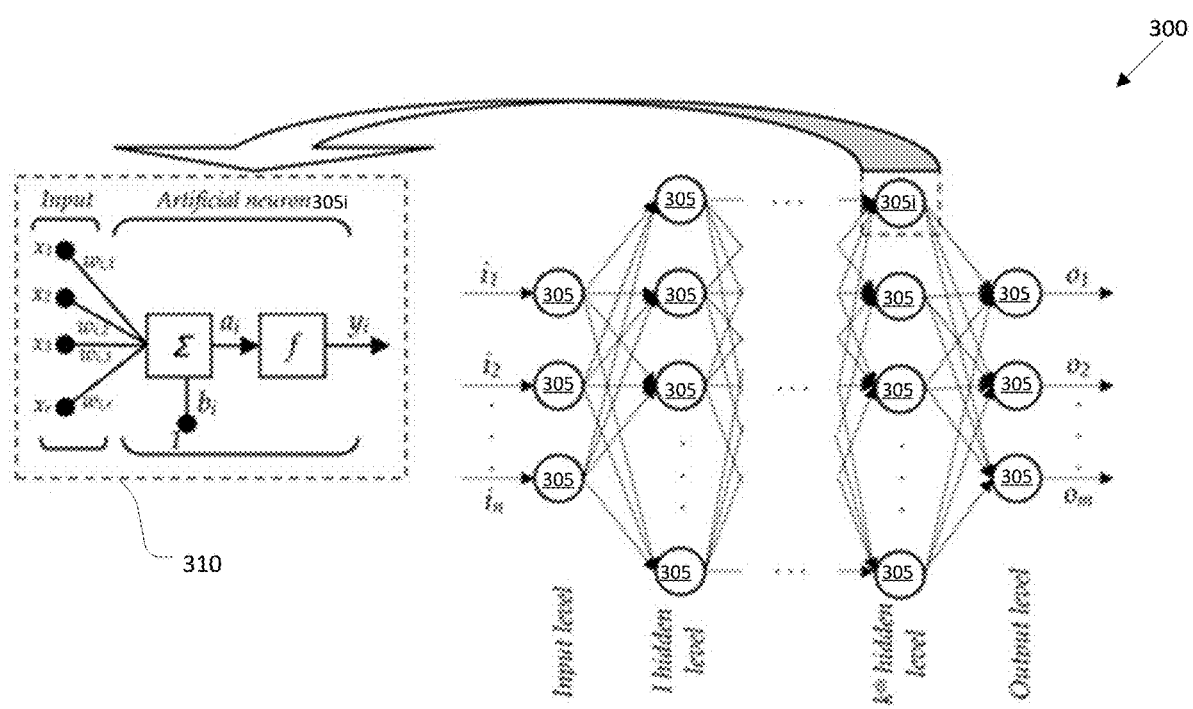
FIG. 3 is a diagram of an example deep neural network (DNN).

FIG. 3 is a diagram of an example deep neural network (DNN) 300. The DNN 300 can be a software program that can be loaded in memory and executed by a processor included in computer 105, for example. The DNN 300 can include n input nodes 305, each accepting a set of inputs i (i.e., each set of inputs i can include on or more inputs x). The DNN 300 can include m output nodes (where m and n may be, but typically are not, a same number) provide sets of outputs $o_1 \ldots o_m$. The DNN 300 includes a plurality of layers, including a number k of hidden layers, each layer including one or more nodes 305. The nodes 305 are sometimes referred to as artificial neurons 305, because they are designed to emulate biological, e.g., human, neurons. The neuron block 310 illustrates inputs to and processing in an example artificial neuron 305i. A set of inputs $x_1 \ldots x_r$ to each neuron 305 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 305i output $y_i$. The activation function $f$ can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept as input data 115, e.g., from the vehicle 101 CAN bus as illustrated in Table 1 above, and to output an impact severity, and identified impacted wheel 155, and/or a predicted impact cause. The DNN 300 can be trained with ground truth data, i.e., data about a real-world condition or state. Weights w can be initialized by using a Gaussian distribution, for example, and a bias b for each node 305 can be set to zero. Training the DNN 300 can including updating weights and biases via conventional techniques such as back-propagation with optimizations. Example initial and final (i.e., after training) parameters (parameters in this context being weights w and bias b) for a node 305 in one example were as follows:

| Parameters | Initial value | Final value |
|---|---|---|
| $w_1$ | 0.902 | −0149438 |
| $w_2$ | −0.446 | −0.0103792 |
| $w_3$ | 1.152 | 0.00850074 |
| $w_r$ | 0.649 | 0.00349599 |
| $b_i$ | 0 | 0.00241366 |

A set of weights w for a node 305 together are a weight vector for the node 305. Weight vectors for respective nodes 305 in a same layer of the DNN 300 can be combined to form a weight matrix for the layer. Bias values b for respective nodes 305 in a same layer of the DNN 300 can be combined to form a bias vector for the layer. The weight matrix for each layer and bias vector for each layer can then be used in the trained DNN 300.

In the present context, the ground truth data used to train the DNN 300 typically includes data 115 from a vehicle 101 CAN bus about a wheel 155 impact. For example, data 115 can be gathered from accelerometers mounted to vehicle 101 suspension parts, e.g., spindle, shock tower, etc. The data 115 can then be labeled for training the DNN, i.e., tags identifying conditions such as an impact severity level (e.g., on a scale of 0 to 5 as discussed above), a predicted impact cause, a specific vehicle 101 wheel (e.g., right front, right rear, etc.) that was impacted, etc.

Figure 4:
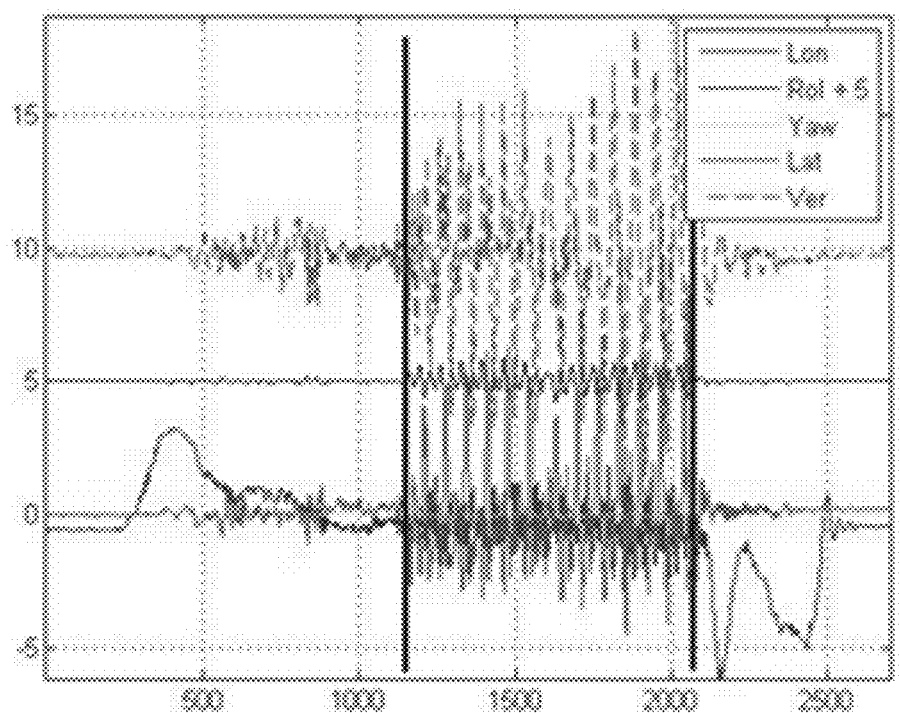
FIG. 4 illustrates an exemplary graph showing data that can be selected for labeling and training a DNN.
Figure 5:
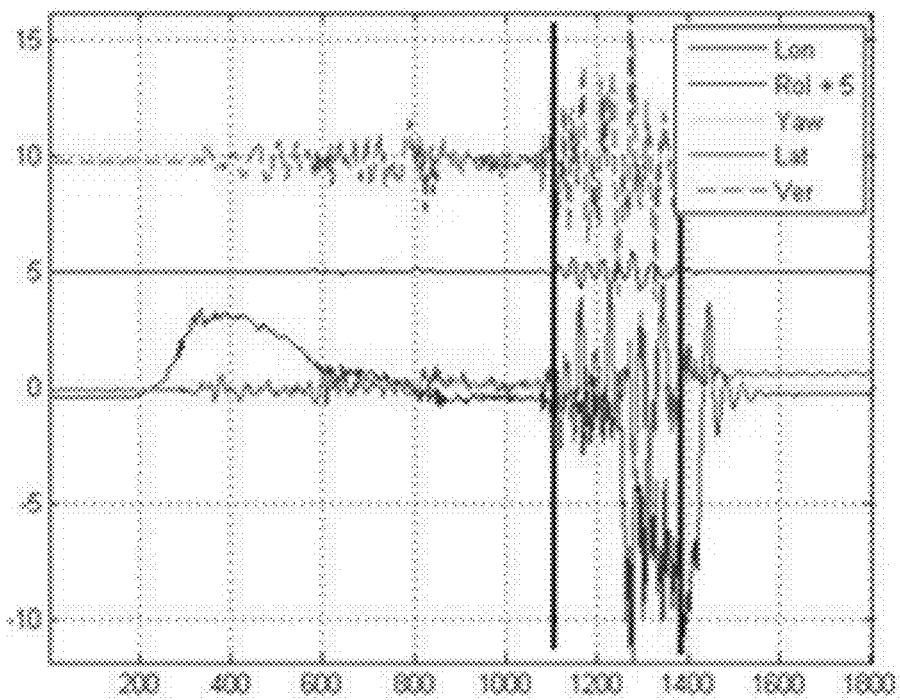
FIG. 5 illustrates another exemplary graph showing data that can be selected for labeling and training a DNN.

FIGS. 4 and 5 illustrate data 115 selected for labeling and training the DNN 300. The vertical or y-axes in the respective illustrated graphs show a normalized scale for various data 115, such as yaw rate data, longitudinal, lateral, and vertical acceleration, and a roll rate. The respective horizontal or x-axes represent time in milliseconds. As can be seen for certain periods of time in each graph, all data values noticeably oscillate between greater extremes than for other times in each graph. Thus, data 115 in these time periods can be selected for labeling and training the DNN 300.

Figure 6:
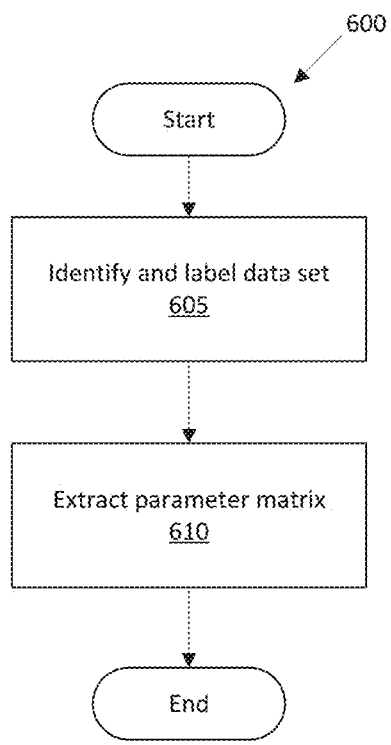
FIG. 6 illustrates a training process for a DNN.

FIG. 6 illustrates a training process 600 for a DNN 300. The process may begin in a block 605, in which a training data set, e.g., as discussed above concerning FIGS. 4 and 5, is identified and labeled. Then in a block 610, the DNN 300 is trained whereby a parameter matrix, e.g., including weights and biases as discussed above, can be extracted. Then the process 600 ends.

Figure 7:
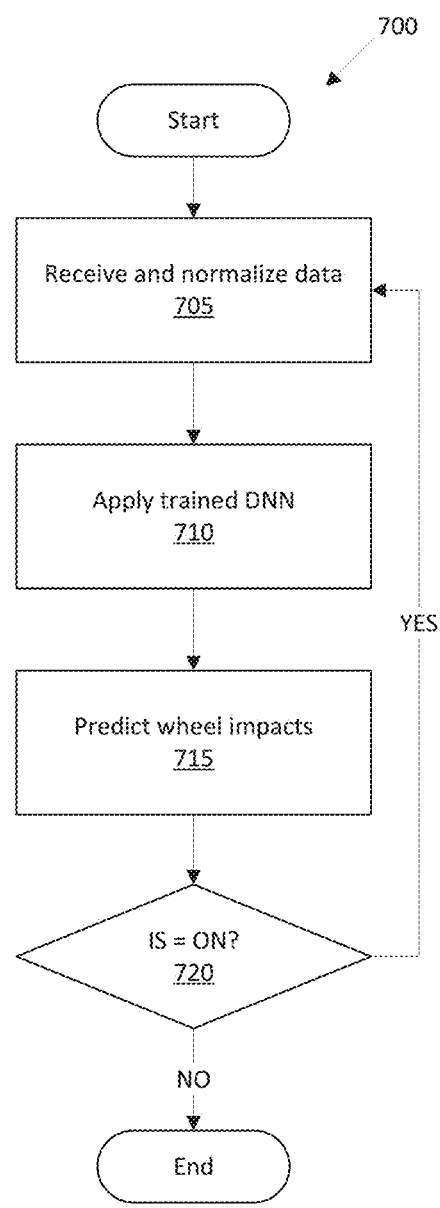
FIG. 7 illustrates a process by which a DNN can predict wheel impact events.

FIG. 7 illustrates a process 700 by which a DNN 300 predicts wheel impact events, including an impact severity level for a detected wheel impact (i.e., wheel impact event). The process 700 can be practiced on its own. Moreover, as discussed further below concerning FIG. 8, DNN-based impact determination can be practiced in combination with threshold-based determination. DNN-based impact determination has the advantage over the threshold-based determination process 200 of being based on machine learning and therefore able to account for factors other than those explicitly included in inputs from data 115. Further, because the DNN 300 can be trained over time in a vehicle 101, the process 700 advantageously can be tailored to a specific vehicle 101, and can change over time as a vehicle 101 changes, e.g., changes in tires, tire pressure, suspension stiffness, etc., can change detections on wheel impact events. Such changes would not be accounted for by the threshold-based determination of process 500, but are accounted for in the DNN 300, providing greater accuracy and reliability than the process 200. A further advantage that may be realized from the DNN 300 and the process 700 over threshold-based determination such as in process 200 is that, because threshold-based determination relies on data 115 with for multiple timesteps. if timestamps on data 115 are corrupted or otherwise inconsistent, especially over multiple timestamps, impact determinations from a threshold-based determination such as in the process 200 may be inaccurate, e.g., an impact may be determined where none in fact occurred, or an actual impact may not be detected, and/or an impact severity level may be improperly reported. Thus, confirming a detected impact and/or impact severity level with the DNN 300 in addition to threshold based impact determination can advantageously increase a confidence level in an impact determination and/or impact severity level determination.

The process 700 may begin in a block 705, in which the computer 105 receives and normalizes data 115, e.g., vehicle 101 CAN bus data as described above and as illustrated in Table 1. Typically data 115 received in a predetermined time step, e.g., 10 ms (milliseconds), 100 ms, etc., can be analyzed by the computer 105 in substantially real time to determine a mean and standard deviation for the data 115, e.g., a vehicle 101 yaw rate, a vehicle 101 speed, a vehicle 101 acceleration, etc., in the time step. Data values outside of a standard deviation can be ignored, and the data value provided to the DNN 300 can be normalized according to the mean data value for the time step.

Next, in a block 710, data received in normalized in the block 705 is input to the DNN 300 to obtain outputs identifying one or more impact events. For example, as described above, outputs could include an impact severity level, and identified wheel 155 impacted, and/or a predicted cause of the impact event.

Next, in a block 715, the computer 105 analyzes the outputs obtained in the block 710 to determine if one or more impact events are identified, e.g., one or more events with an impact severity level greater than zero. Further, the computer 105 stores the impact event, e.g., according to a timestamp, and impact severity level, identified wheel 155 impacted, and/or predicted cause of the impact event.

Next, in a block 720, the computer 105 determines whether to continue the process 800. For example, as illustrated in the representation of the block 720 in FIG. 7, the computer 101 could determine whether the vehicle 101 ignition is ON (or OFF). Alternatively or additionally, the computer 105 could be powered off, user input disabling impact detection could be received, etc. If the ignition is powered off, or the process 700 is otherwise not to continue, then the process 700 ends following the block 720; otherwise, the process 700 returns to the block 705.

Hybrid Determination

Figure 8:
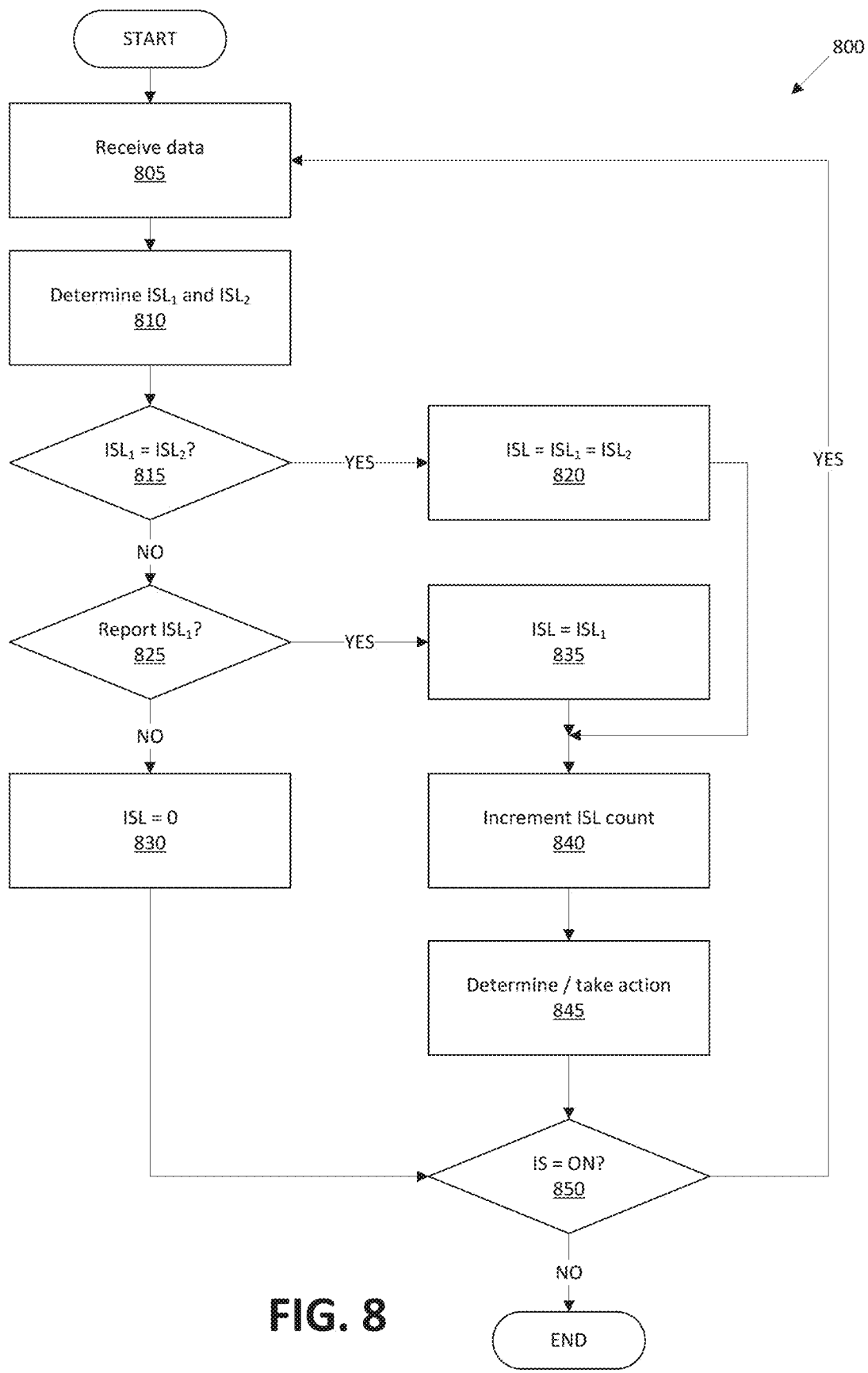
FIG. 8 illustrates an exemplary process for combining outputs of a threshold based determination and a deep learning based determination of an impact event.

FIG. 8 illustrates an exemplary process 800 for combining outputs of a threshold based determination and a deep learning based determination of an impact event. As mentioned above, DNN-based determination can have advantages over threshold-based determination. However, it has been found that, based on unreliability of individual items of data 115 from sensors 110, i.e., data 115 for a single timestep, data 115 for the DNN 300 can result in the DNN 300 providing false positives. Threshold-based determination, on the other hand, utilizes data 115 for multiple timesteps, and therefore while possibly less precise, can serve as a check on false positives from the DNN 300.

FIG. 8 can begin in a block 805, e.g., after a vehicle 101 is powered on (e.g., ignition status equals ON) and/or placed into a drive mode. In the block 805, the computer 105 receives data 115, e.g., as illustrated above in Table 1.

Next, in a block 810, the computer 105 determines respective impact severity levels according to a threshold based determination or algorithm, e.g., as discussed above concerning FIG. 2, and a DNN based determination, e.g., as discussed above concerning FIGS. 3-7. For convenience in the figures, the threshold based determined impact severity level is referred to as $ISL_1$ and the DNN based determined impact severity level is referred to as $ISL_2$. Typically, the respective impact severity levels will have been determined according to a same scale, e.g., the scale of 0 to 5 discussed above. However, as should be clear from the above, but for the sake of clarity, note that a first set of data 115 input to the threshold based algorithm and a second set of data input to the DNN 300 may include data elements in common, e.g., vehicle 101 velocity, acceleration, etc., but likely will include differing data elements. That is, a first set of data input to the threshold based algorithm may include data elements not provided to the DNN 300, i.e., not in the second set of data. Alternatively or additionally, a second set of data input to the DNN 300 may include data elements not provided to the threshold based algorithm, i.e., not in the first set of data.

Next, in a decision block 815, the computer 105 determines whether $ISL_1$ and $ISL_2$ are the same. If so, the process 800 proceeds to a block 820. Otherwise, the process 800 proceeds to a decision block 825.

In the block 820, which may follow the block 815, the computer 105 stores a record of an impact event, e.g., according to a timestamp and indicating the impact severity level determined according to $ISL_1$ and $ISL_2$, possibly along with other data including an affected wheel 155 and/or a predicted cause of the impact event. Following the block 820, the process 800 proceeds to a block 840.

In the decision block 825, which may follow the block 815, the computer 105 determines whether a condition or conditions are met so that the impact severity level determined by the threshold based determination should be reported or stored. For example, the computer 105 could be programmed to determine whether the following expression (2) evaluates to TRUE:

$$a_{total} \geq k^* f(v)^* g \text{ AND } ISL_1 > 0.$$

where g is a value for one standard gravity, k is a constant that can be empirically determined, e.g., by test driving, to relate total acceleration to speed, and f(v) is velocity or some function of velocity. If the condition or conditions specified for reporting the threshold based determination are met, e.g., expression (2) evaluates to true, then the process 800 proceeds to a block 835. Otherwise, the process 800 proceeds to a block 830.

In the block 830, the computer 105 stores a record of an impact events with an impact severity level of zero, or alternatively, simply stores no impact event. Following the block 830, the process 800 proceeds to a decision block 850.

In the block 835, which may follow the block 825, the computer 105 stores a record of an impact event, e.g., according to a timestamp and indicating the impact severity level determined according to $ISL_1$, possibly along with other data including an affected wheel 155 and/or a predicted cause of the impact event. Following the block 835, the process 800 proceeds to a block 840.

In the block 840, the computer 105 increments one or more counters that each store a number of incidents of impact events, e.g., at respective impact severity levels and since the counters were last reset, e.g., by a technician providing input to the computer 105 during a maintenance event.

Next, in a block 845, the computer 105 determines whether to take action, i.e., actuate or control one or more vehicle 101 components 120, based on respective values of the one or more counters. For example, the computer 105 could be programmed to determine a "total impact event count" TC according to a formula that takes into account a number or count of impact events at respective severity levels (the respective counts each denoted below as $C_{ISLn}$), the number of events at each level being weighted to assign greater weight to events at higher severity levels. The weights could be determined according to a linear formula or some other formula to account for increasing import of increasing severity levels, e.g., in the example below the weights could increase linearly from a value of 0.2 for $W_1$ to 1 for $W_5$.

$$TC = W_1^* C_{ISL1} + W_2^* C_{ISL2} + W_3^* C_{ISL3} + W_4^* C_{ISL4} + W_5^* C_{ISL5}.$$

For example, where the total impact event count TC exceeds a predetermined count threshold, the computer 105 could be programmed to take a specified action. For example, once a total impact event count TC exceeds, e.g., a value of 10, the computer 105 could be programmed to actuate a vehicle 101 communications component 120, e.g., a wireless transceiver communicating via the network 125, to transmit a message via a vehicle 101 HMI (human machine interface, e.g., including a touchscreen display) and/or via the network 125 to the server 130 or a user device, that vehicle 101 maintenance is recommended. Further, the computer 105 could be programmed to take a plurality of actions based on a respective plurality of predetermined count thresholds. For example, in addition to being programmed to indicate maintenance once a first threshold is exceeded, the computer 105 could be programmed to modify operation of the vehicle 101, e.g., control propulsion and/or brake components 120 to limit vehicle 101 speed to a predetermined threshold, once a second threshold is met or exceeded, e.g., a TC count of 50.

Yet further for example, the computer 105 could compare individual impact severity counts to respective thresholds and then take action based on a result of such comparison. For example, the computer 105 could be programmed to provide a message recommending maintenance if a count $C_{ISL5}$ was 1 or more, or if a count $C_{ISL4}$ was 2 or more. Likewise, the computer 105 could be programmed to limit vehicle speed, e.g., to 20 km/h, 30 km/h, etc., if a count $C_{ISL5}$ was 1 or more, if a count $C_{ISL4}$ was 2 or more, or if a count $C_{ISL3}$ was 3 or more. Yet further, if a vehicle 101 is capable of autonomous or semi-autonomous operation, the computer 105 could be programmed to operate a vehicle to a safe stop, e.g., on a road shoulder, and a parking lot, etc., upon determining that, e.g., $C_{ISL5}$ exceeded 1, or TC a exceeded a predetermined threshold, e.g., 5.

Note that the blocks 840, 845 could also be executed as part of processes 200, 700, described above. That is, if either of threshold based determination or DNN based determination of wheel impact events are performed alone, one or more counters may be incremented and/or one or more actions may be taken as described with respect to the blocks 840, 845.

The block 850 may follow either of the blocks 830, 845. In the block 850, the computer 105 determines whether to continue the process 800. For example, as illustrated in the representation of the block 850 in FIG. 8, the computer 101 could determine whether the vehicle 101 ignition is ON (or OFF). Alternatively or additionally, the computer 105 could be powered off, user input disabling impact detection could be received, etc. If the ignition is powered off, or the process 800 is otherwise not to continue, then the process 800 ends following the block 850; otherwise, the process 800 returns to the block 805.

CONCLUSION

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory.

Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A computer comprising a processor and a memory, the memory storing instructions executable by the processor to:
provide a first set of vehicle data to a deep neural network;
provide a second set of vehicle data to a threshold based algorithm that compares vehicle acceleration and velocity to one or more thresholds;
perform a comparison of a first impact severity level output from the deep neural network to a second impact severity level output by the threshold based algorithm; and
determine a vehicle wheel impact event based at least in part on the comparison of the first impact severity level output from the deep neural network and the second impact severity level output by the threshold based algorithm.

2. The computer of claim 1, the instructions further including instructions to determine that the first impact severity level and the second impact severity level differ, and to then determine the vehicle wheel impact event based on the second impact severity level.

3. The computer of claim 1, wherein each of the first set of data and the second set of data include at least one of velocity, yaw rate, roll rate, total acceleration, vertical acceleration, lateral acceleration, longitudinal acceleration, a wheel speed, a brake torque, an accelerator pedal position, a steering angle, and an ignition status.

4. The computer of claim 1, the instructions further including instructions to actuate a vehicle component based on the wheel impact event.

5. The computer of claim 1, wherein the wheel impact event includes one or more of an impact severity, a predicted impact cause, and an identification of an impacted wheel.

6. The computer of claim 5, wherein the impact severity is selected from a plurality of impact severity levels.

7. A method, comprising:
providing a first set of vehicle data to a deep neural network;
providing a second set of vehicle data to a threshold based algorithm that compares vehicle acceleration and velocity to one or more thresholds;
performing a comparison of a first impact severity level output from the deep neural network to a second impact severity level output by the threshold based algorithm; and
determining a vehicle wheel impact event based at least in part on the comparison of the first impact severity level output from the deep neural network and the second impact severity level output by the threshold based algorithm.

8. The method of claim 7, further comprising comparing a first impact severity level output from the deep neural network to a second impact severity level output by the threshold based algorithm.

9. The method of claim 7, wherein the first set of vehicle data includes at least one of velocity, yaw rate, roll rate, total acceleration, vertical acceleration, lateral acceleration, longitudinal acceleration, a wheel speed, a brake torque, an accelerator pedal position, a steering angle, and an ignition status.

10. The method of claim 7, further comprising actuating a vehicle component based on the wheel impact event.

11. The method of claim 7, wherein the wheel impact event includes one or more of an impact severity, a predicted impact cause, and an identification of an impacted wheel.

12. The method of claim 11, wherein the impact severity is selected from a plurality of impact severity levels.

13. The method of claim 8, further comprising determining that the first impact severity level and the second impact severity level differ, and then determining the vehicle wheel impact event based on the second impact severity level.

* * * * *